United States Patent
Doi et al.

(10) Patent No.: US 9,382,402 B2
(45) Date of Patent: Jul. 5, 2016

(54) FLAME-RETARDANT SILICONE RESIN COMPOSITION AND FLAME-RETARDANT SILICONE RESIN SHEET

(71) Applicant: NITTO DENKO CORPORATION, Osaka (JP)

(72) Inventors: Kohei Doi, Osaka (JP); Kunio Nagasaki, Osaka (JP); Yusuke Sugino, Osaka (JP); Takafumi Hida, Osaka (JP); Yusuke Nakayama, Osaka (JP); Keisuke Hirano, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/390,908

(22) PCT Filed: Apr. 9, 2013

(86) PCT No.: PCT/JP2013/060718
§ 371 (c)(1),
(2) Date: Oct. 6, 2014

(87) PCT Pub. No.: WO2013/154104
PCT Pub. Date: Oct. 17, 2013

(65) Prior Publication Data
US 2015/0062896 A1    Mar. 5, 2015

(30) Foreign Application Priority Data
Apr. 11, 2012  (JP) .................................. 2012-090574

(51) Int. Cl.
*C08K 3/40* (2006.01)
*C08J 5/18* (2006.01)
(Continued)

(52) U.S. Cl.
CPC ... *C08K 3/40* (2013.01); *C08J 5/18* (2013.01); *C08K 3/0058* (2013.01); *C08K 3/36* (2013.01);
(Continued)

(58) Field of Classification Search
None
See application file for complete search history.

(56) References Cited

U.S. PATENT DOCUMENTS 2,610,167 A * 9/1952 Te Grotenhuis ......... C08K 9/06
                                                             106/287.14
3,976,497 A * 8/1976 Clark .................. C09D 183/04
                                                             106/287.12

(Continued)

FOREIGN PATENT DOCUMENTS

EP        2199346 A2    6/2010
EP        2351787 A2    8/2011
(Continued)

OTHER PUBLICATIONS

Search report issued with respect to application No. PCT/JP2013/060718, mail date is Jul. 16, 2013.
(Continued)

*Primary Examiner* — Robert S Loewe
(74) *Attorney, Agent, or Firm* — Greenblum & Bernstein, P.L.C.

(57) ABSTRACT

The flame-retardant silicone resin composition of the present invention comprises: an inorganic oxide particle-containing condensation-reactive silicone resin (A) comprising a crosslinking structure in which inorganic oxide particles dispersed in a polysiloxane resin having a condensation-reactive group are crosslinked with the polysiloxane resin by chemical bonds; and inorganic particles (B). The inorganic oxide particles are preferably at least one type of inorganic oxide particles selected from the group consisting of silica, alumina, glass frit, and antimony-doped tin oxide.

15 Claims, 1 Drawing Sheet

(51) Int. Cl.
*C08L 83/04* (2006.01)
*C08K 3/00* (2006.01)
*F21V 1/16* (2006.01)
*C08K 3/36* (2006.01)
*F21V 25/12* (2006.01)
*F21V 3/04* (2006.01)

(52) U.S. Cl.
CPC . *C08L 83/04* (2013.01); *F21V 1/16* (2013.01); *C08J 2383/04* (2013.01); *F21V 3/0436* (2013.01); *F21V 25/12* (2013.01)

(56) References Cited

U.S. PATENT DOCUMENTS

| | | | | |
|---|---|---|---|---|
| 4,170,690 A | * | 10/1979 | Armbruster | C09D 183/04 106/287.14 |
| 4,390,373 A | * | 6/1983 | White | C09D 183/04 106/287.12 |
| 4,410,594 A | * | 10/1983 | Olson | C08J 7/065 427/160 |
| 4,435,219 A | * | 3/1984 | Greigger | C09D 183/04 106/287.12 |
| 4,439,239 A | * | 3/1984 | Greigger | C04B 26/32 106/287.16 |
| 4,450,255 A | * | 5/1984 | Baney | C09D 5/08 524/430 |
| 4,486,503 A | * | 12/1984 | Vaughn, Jr. | C09D 183/04 428/412 |
| 4,615,947 A | * | 10/1986 | Goossens | C09D 133/06 428/412 |
| 4,769,405 A | | 9/1988 | Kondo et al. | |
| 4,978,702 A | * | 12/1990 | Yuyama | C09D 183/04 524/266 |
| 5,283,279 A | * | 2/1994 | Hara | C09D 183/10 524/188 |
| 5,514,466 A | * | 5/1996 | Yamada | C08J 7/047 428/1.51 |
| 5,552,466 A | * | 9/1996 | Beckley | C08L 830/04 428/447 |
| 6,639,015 B1 | * | 10/2003 | Nakashima | C09D 183/04 106/287.1 |
| 2001/0044060 A1 | * | 11/2001 | Shida | G03G 5/14773 430/58.2 |
| 2003/0236347 A1 | * | 12/2003 | Furuya | C09D 183/14 524/588 |
| 2004/0232821 A1 | * | 11/2004 | Boehmer | C03C 17/005 313/489 |
| 2004/0254291 A1 | * | 12/2004 | Kobayashi | C08G 77/44 524/588 |
| 2007/0075616 A1 | * | 4/2007 | Van Sprang | G02B 5/286 313/110 |
| 2008/0261024 A1 | * | 10/2008 | Xenopoulos | C04B 26/32 428/331 |
| 2009/0104447 A1 | | 4/2009 | Kita et al. | |
| 2009/0163654 A1 | * | 6/2009 | Hirano | C08G 77/18 524/783 |
| 2009/0258170 A1 | * | 10/2009 | Kawagoshi | C08L 69/00 428/1.32 |
| 2010/0155871 A1 | | 6/2010 | Hirano et al. | |
| 2010/0160577 A1 | * | 6/2010 | Hirano | C08L 83/04 525/477 |
| 2011/0186792 A1 | * | 8/2011 | Hirano | C08K 3/22 252/589 |
| 2011/0189478 A1 | * | 8/2011 | Hirano | C09J 133/08 428/355 AC |
| 2011/0223421 A1 | * | 9/2011 | Harimoto | C08K 9/08 428/355 R |
| 2012/0052296 A1 | * | 3/2012 | Ikeno | C08G 77/04 428/396 |

FOREIGN PATENT DOCUMENTS

| | | |
|---|---|---|
| JP | S62-218458 A | 9/1987 |
| JP | H07-186333 A | 7/1995 |
| JP | H11-158380 A | 6/1999 |
| JP | 4491778 B2 | 12/2005 |
| JP | 4539349 B2 | 8/2006 |
| JP | 2013-103415 A | 5/2013 |
| WO | 2007/105741 A1 | 9/2007 |

OTHER PUBLICATIONS

European Search Report issued with respect to application No. 13776178.9, mail date is Oct. 1, 2015.

* cited by examiner

FLAME-RETARDANT SILICONE RESIN COMPOSITION AND FLAME-RETARDANT SILICONE RESIN SHEET

TECHNICAL FIELD

The present invention relates to a flame-retardant silicone resin composition, a flame-retardant silicone resin sheet formed using the composition, and a luminaire using the flame-retardant silicone resin sheet.

BACKGROUND ART

Conventionally, a halogen flame retardant has been widely used as a flame retardant to impart flame retardancy to a coating composition (for example, see Patent Literature 1). However, this method is not preferred in terms of environmental protection because it Poses a problem of dioxin and chlorofluorocarbon generated from the halogenated flame retardant. Further, inorganic flame retardants such as aluminum hydroxide are also used as a flame retardant to impart flame retardancy to a coating composition. However, aluminum hydroxide has a problem of reducing the physical properties of a coating material and a substrate to which the coating material is applied and physical properties such as water resistance.

There is also a method of coating a plastic with an inorganic coating material to impart flame retardancy to the plastic. However, since the inorganic coating material has a low flexibility and is easily cracked, it is difficult to form a thick coating film. Thus, the coating material itself has flame retardancy, but in the case of a composite with a plastic, the heat from flame will be transferred to the plastics when the flame is brought into contact with the composite, and the plastic will carbonize or result in spread of fire. Further, in the case of a coating material containing an organic binder, the organic binder will carbonize when the flame is brought into contact with the coating material. Therefore, a plastic coated with these coating materials is difficult for use in the applications in which non-carbonizing properties are required such as a railway rolling stock application.

Conventionally, there has been known an illumination cover for railway rolling stocks prepared by applying an inorganic coating agent to a glass fiber sheet. However, a light diffusing member prepared by coating or impregnating a glass fiber sheet with a common inorganic coating agent has a problem of low flame resistance when a binder includes an organic component and has a disadvantage of low flexibility to be easily cracked when the binder is an inorganic component.

Patent Literature 2 discloses a sheet comprising at least one glass fiber fabric and a pair of resin layers sandwiching the glass fiber fabric, wherein the resin layer comprises a thermosetting resin such as vinyl ester or a photocurable resin. Further, Patent Literature 3 discloses a glass fiber sheet comprising at least one glass fiber fabric, a resin coating layer made of a thermosetting resin, wherein the glass fiber fabric is impregnated with the thermosetting resin followed by solidification of the resin to form the coating layer, and a bead layer on at least one surface of the resin coating layer. However, all of these light diffusing sheets have insufficient flame resistance and low flexibility.

CITATION LIST

Patent Literature

Patent Literature 1: Japanese Patent Laid-Open No. 7-186333
Patent Literature 2: Japanese Patent No. 4491778
Patent Literature 3: Japanese Patent No. 4539349

SUMMARY OF INVENTION

Technical Problem

The object of the present invention is to provide a flame-retardant silicone resin composition which is significantly excellent in flame retardancy, a flame-retardant silicone resin sheet formed from the composition, and a luminaire using the flame-retardant silicone resin sheet.

Solution to Problem

As a result of intensive study to achieve the above object, the present inventors have found that a silicone resin sheet having extremely high flame retardancy is obtained by using a silicone resin composition further blended inorganic particles with a condensation-reactive silicone resin having a crosslinking structure in which the resin is crosslinked with inorganic oxide particles, and have completed the present invention based on these findings.

Specifically, the present invention provides a flame-retardant silicone resin composition comprising: an inorganic oxide particle-containing condensation-reactive silicone resin (A) comprising a crosslinking structure in which inorganic oxide particles dispersed in a polysiloxane resin having a condensation-reactive group are crosslinked with the polysiloxane resin by chemical bonds; and inorganic particles (B).

The inorganic oxide particles may be at least one type of inorganic oxide particles selected from the group consisting of silica, alumina, glass frit, and antimony-doped tin oxide.

The inorganic particles (B) may be at least one type of inorganic particles selected from the group consisting of glass frit, silica particles, alumina particles, aluminum hydroxide particles, magnesium hydroxide particles, tin oxide particles, and clay mineral particles.

The yield point of the glass frit as the inorganic particles (B) may be not less than 300° C. and not more than 700° C.

The glass frit as the inorganic particles (B) may be a glass frit formed from at least one component selected from silicic acid, boric acid, borosilicic acid, aluminum oxide, calcium oxide, sodium oxide, lithium oxide, and phosphorus oxide. The glass frit as the inorganic particles (B) is particularly preferably a glass frit formed from a component containing at least phosphorus oxide. The average particle size of the glass frit as the inorganic particles (B) is, for example, 0.1 μm to 1000 μm.

The content of the inorganic particles (B) is, for example, 0.1 to 500 parts by weight relative to 100 parts by weight of the inorganic oxide particle-containing condensation-reactive silicone resin (A).

In the inorganic oxide particle-containing condensation-reactive silicone resin (A), (i) a condensation-reactive group-containing polysilsesquioxane having a basic structural unit of a T unit, or (ii) a combination of the condensation-reactive group-containing polysilsesquioxane having the basic structural unit of a T-unit and a condensation-reactive group-containing polysiloxane and/or a polysiloxane resin having a silanol group having a basic structural unit of a D-unit and a T-unit may be used as the polysiloxane resin having a condensation-reactive group.

The present invention also provides a flame-retardant silicone resin sheet formed from the flame-retardant silicone resin composition.

The flame-retardant silicone resin sheet has a thickness of, for example, 5 to 5000 μm.

The flame-retardant silicone resin sheet preferably has the property of not igniting or carbonizing in the combustion test of the Railway Rolling Stock Material Combustion Test.

The flame-retardant silicone resin sheet may have a gross calorific value per 10 minutes of not more than 30 MJ/m$^2$, a maximum heat release rate of not more than 300 kW/m$^2$, and an ignition time of not less than 60 seconds, as measured by the cone calorimeter test according to ISO 5660-1.

The flame-retardant silicone resin sheet is used, for example, as an interior member for transportation equipment, a building material member, a display member, a household appliance member, or an electronic circuit member.

Examples of the interior member for transportation equipment include an illumination cover.

The present invention further provides an luminaire using the flame-retardant silicone resin sheet, the luminaire comprising: at least a light source for generating light used for illumination; and an illumination cover comprising the flame-retardant silicone resin sheet, being installed so as to cover the light source, wherein the light from the light source is emitted after passing through the flame-retardant silicone resin sheet.

Advantageous Effects of Invention

Since the flame-retardant silicone resin composition of the present invention comprises a condensation-reactive silicone resin having a crosslinking structure in which the resin is crosslinked with inorganic oxide particles and is further blended with inorganic oxide particles, the resulting coating film has an improved strength and shows extremely high flame retardancy. Consequently, the flame-retardant silicone resin sheet of the present invention formed using the composition is also significantly excellent in flame retardancy, does not result in spread of fire when it is brought into contact with flame, and preferably does not ignite nor carbonize. Therefore, it is particularly useful as an interior member of transportation equipment, such as railway rolling stock, an airplane, a motor vehicle, a ship, an elevator, and an escalator, a building material member, a display member, a household appliance member, and an electronic circuit member. In addition, it can be particularly suitably used as an illumination cover of a luminaire.

DESCRIPTION OF EMBODIMENTS

[Flame-retardant Silicone Resin Composition]

Figure 1:
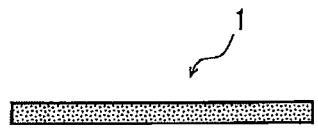
FIG. 1 is a schematic sectional view showing the flame-retardant silicone resin sheet of the present invention.

The flame-retardant silicone resin composition of the present invention comprises: an inorganic oxide particle-containing condensation-reactive silicone resin (A) comprising a crosslinking structure in which inorganic oxide particles dispersed in a polysiloxane resin having a condensation-reactive group are crosslinked with the polysiloxane resin by chemical bonds; and inorganic particles (B).

[Inorganic Oxide Particle-containing Condensation-reactive Silicone Resin (A)]

The "condensation-reactive silicone resin" in the inorganic oxide particle-containing condensation-reactive silicone resin (A) is not particularly limited as long as it is a silicone resin (polysiloxane resin) having a condensation-reactive group, and examples thereof include a condensation-reactive group-containing polysiloxane having a basic structural unit of a D-unit and a T-unit (hereinafter, may be referred to as a "D·T-unit condensation-reactive group-containing polysiloxane"), a condensation-reactive group-containing polysilsesquioxane having a basic structural unit of a T-unit (hereinafter, may be referred to as a "condensation-reactive group-containing polysilsesquioxane"), and a condensation-reactive group-containing polysiloxane having a basic structural unit of an M-unit and a Q-unit. These may be used alone or in combination of two or more thereof.

Among the condensation-reactive silicone resins, the D·T-unit condensation-reactive group-containing polysiloxane, the condensation-reactive group-containing polysilsesquioxane, and a combination of the D·T-unit condensation-reactive group-containing polysiloxane and the condensation-reactive group-containing polysilsesquioxane are preferred in terms of being capable of providing flexibility to the composite member. In the present invention, the condensation-reactive group-containing polysilsesquioxane or a combination of the D·T-unit condensation-reactive group-containing polysiloxane and the condensation-reactive group-containing polysilsesquioxane is particularly preferred.

Examples of the condensation-reactive group include a silanol group, an alkoxysilyl group, (for example, a $C_{1-6}$ alkoxysilyl group), a cycloalkyloxysilyl group (for example, a $C_{3-6}$ cycloalkyloxysilyl group), an aryloxysilyl group (for example, a $C_{6-10}$ aryloxysilyl group). Among these groups, a silanol group, an alkoxysilyl group, a cycloalkyloxysilyl group, and an aryloxysilyl group are preferred, and a silanol group and an alkoxysilyl group are particularly preferred.

The D·T-unit condensation-reactive group-containing polysiloxane specifically contains a D-unit represented by the following formula (1) and a T-unit represented by the following formula (2) as the basic structural unit.

[Formula 1]

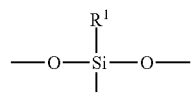

(1)

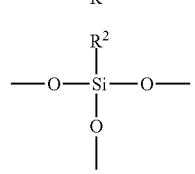

(2)

In the above formula (1), $R^1$ is the same or different and represents a monovalent hydrocarbon group selected from a saturated hydrocarbon group and an aromatic hydrocarbon group. In the formula (2), $R^2$ represents a monovalent hydrocarbon group selected from a saturated hydrocarbon group and an aromatic hydrocarbon group.

Examples of the saturated hydrocarbon group for the above $R^1$ and $R^2$ include a linear or branched alkyl group having 1 to 6 carbon atoms, such as a methyl, ethyl, propyl, isopropyl, butyl, isobutyl, pentyl, or hexyl group; and a cycloalkyl group having 3 to 6 carbon atoms, such as a cyclopentyl or cyclohexyl group. Further, examples of the aromatic hydrocarbon group for the above $R^1$ and $R^2$ include an aryl group having 6 to 10 carbon atoms, such as a phenyl or naphthyl group.

The $R^1$ and $R^2$ are each preferably an alkyl group having 1 to 6 carbon atoms and an aryl group having 6 to 10 carbon atoms, and more preferably a methyl group.

The D-unit represented by the formula (1) may be the same or different in the D·T-unit condensation-reactive group-containing polysiloxane, but it is preferably the same. The T-unit represented by the formula (2) may be the same or different in the D·T-unit condensation-reactive group-containing polysiloxane, but it is preferably the same.

Further, the D·T-unit condensation-reactive group-containing polysiloxane is a partial condensate of a corresponding silicone monomer [for example, a partial condensate of a difunctional silicone monomer, such as a dialkyl (or aryl) dialkoxysilane, and a trifunctional silicone monomer, such as an alkyl (or aryl) trialkoxysilane], and in the structural unit, it has a D-unit, a T-unit, and a group represented by the following formula (3):

$$—OR^3 \qquad (3).$$

The group represented by the formula (3) is bonded to a silicon atom and is present at a molecular terminal.

The $R^3$ represents a monovalent hydrocarbon group selected from a saturated hydrocarbon group and an aromatic hydrocarbon group. Examples of the saturated hydrocarbon group and the aromatic hydrocarbon group include the same groups as the saturated hydrocarbon group and the aromatic hydrocarbon group for $R^1$ in the above formula (1). The $R^3$ is preferably a saturated hydrocarbon group, more preferably an alkyl group having 1 to 6 carbon atoms, particularly preferably a methyl group or an ethyl group.

Examples of such the D·T-unit condensation-reactive group-containing polysiloxane include an alkoxysilyl group (for example, a $C_{1-6}$ alkoxysilyl group)-containing polymethylsiloxane, an alkoxysilyl group (for example, a $C_{1-6}$ alkoxysilyl group)-containing polymethylphenylsiloxane, and an alkoxysilyl group (for example, a $C_{1-6}$ alkoxysilyl group)-containing polyphenylsiloxane. These D·T-unit alkoxysilyl group-containing polysiloxanes may be used alone or in combination of two or more thereof.

The D·T-unit condensation-reactive group-containing polysiloxane is preferably a $C_{1-6}$ alkoxysilyl group-containing polysiloxane, more preferably a methoxysilyl group-containing polysiloxane or an ethoxysilyl group-containing polysiloxane, most preferably a methoxysilyl group-containing polymethylsiloxane or an ethoxysilyl group-containing polymethylsiloxane.

The upper limit of the content of the condensation-reactive group (for example, an alkoxysilyl group) of such a D·T-unit condensation-reactive group-containing polysiloxane is, for example, 30% by weight, preferably 25% by weight, and the lower limit thereof is, for example, 8% by weight, preferably 10% by weight, further preferably 12% by weight. The content of the condensation-reactive group (for example, an alkoxysilyl group) can be determined from the proportion of a weight loss measured in heating from room temperature to 300° C. by TGA (differential weight loss measuring device).

The upper limit of the number average molecular weight (in terms of standard polystyrene by GPC measurement) of the D·T-unit condensation-reactive group-containing polysiloxane is, for example, 6000, preferably 5500, more preferably 5300, and the lower limit thereof is, for example, 800, preferably 1000, further preferably 1200.

As the D·T-unit condensation-reactive group-containing polysiloxane, a commercially available product (D·T-unit alkoxysilyl group-containing polysiloxane), such as trade names "X-40-9246" and "X-40-9250" (these are manufactured by Shin-Etsu Chemical Co., Ltd.), can also be used.

The condensation-reactive group-containing polysilsesquioxane specifically contains a T-unit represented by the formula (2) as the basic structural unit. The T-unit represented by the formula (2) may be the same or different in the condensation-reactive group-containing polysilsesquioxane, but it is preferably the same.

Further, the condensation-reactive group-containing polysilsesquioxane is a partial condensate of a corresponding silicone monomer [for example, a partial condensate of a trifunctional silicone monomer, such as an alkyl (or aryl) trialkoxysilane], and in the structural unit, it has a T-unit and a group represented by the following formula (4):

$$—OR^4 \qquad (4).$$

The group represented by the formula (4) is bonded to a silicon atom and is present at a molecular terminal.

The $R^4$ represents a monovalent hydrocarbon group selected from a saturated hydrocarbon group and an aromatic hydrocarbon group. Examples of the saturated hydrocarbon group and the aromatic hydrocarbon group include the same groups as the saturated hydrocarbon group and the aromatic hydrocarbon group for $R^1$ in the above formula (1). The $R^4$ is preferably a saturated hydrocarbon group, more preferably an alkyl group having 1 to 6 carbon atoms, most preferably a methyl group or an ethyl group.

The condensation-reactive group-containing polysilsesquioxanes may be any one of a random type, ladder type, or a basket type, but is most preferably a random type in terms of flexibility. These condensation-reactive group-containing polysilsesquioxanes may be used alone or in combination of two or more thereof.

The condensation-reactive group-containing polysilsesquioxane is preferably a $C_{1-6}$ alkoxysilyl group-containing polysilsesquioxane, more preferably a methoxysilyl group-containing polysilsesquioxane or an ethoxysilyl group-containing polysilsesquioxane, most preferably a methoxysilyl group-containing polymethylsilsesquioxane or an ethoxysilyl group-containing polymethylsilsesquioxane.

The upper limit of the content of the condensation-reactive group (for example, an alkoxysilyl group) of such a condensation-reactive group-containing polysilsesquioxane is, for example, 50% by weight, preferably 48% by weight, further preferably 46% by weight, and the lower limit thereof is, for example, 10% by weight, preferably 15% by weight, further preferably 20% by weight. The content of the condensation-reactive group (for example, an alkoxysilyl group) can be determined from the proportion of a weight loss measured in heating from room temperature to 300° C. by TGA (differential weight loss measuring device).

The upper limit of the number average molecular weight (in terms of standard polystyrene by GPC measurement) of the condensation-reactive group-containing polysilsesquioxane is, for example, 6000, preferably 3500, further preferably 3000, and the lower limit thereof is, for example, 200, preferably 300, further preferably 400.

As the condensation-reactive group-containing polysilsesquioxane, a commercially available product (alkoxysilyl group-containing polysilsesquioxane), such as trade name "KC-89", "KR-500", and "X-40-9225" (these are manufactured by Shin-Etsu Chemical Co., Ltd.), can also be used.

In addition, as the polysiloxane compound having a reactive silanol group in a molecule (at a terminal), a commercially available product, such as trade name "X-21-3153" and "X-21-5841" (these are manufactured by Shin-Etsu Chemical Co., Ltd.), can also be used.

The proportion of the total amount of the D·T-unit condensation-reactive group-containing polysiloxane and the condensation-reactive group-containing polysilsesquioxane to the whole polysiloxane compound is preferably 50% by weight or more, more preferably 70% by weight or more, most preferably 90% by weight or more.

In the present invention, the polysiloxane resin is preferably a polysiloxane resin which has an alkoxysilyl group and/or a silanol group in a molecule (at a terminal) and in which the total content of these groups (alkoxysilyl group and silanol group) is 8 to 48% by weight, wherein the polysiloxane resin is crosslinked with the inorganic oxide particles by chemical bonds. The upper limit of the total content of the alkoxysilyl group and silanol group is more preferably 30% by weight, and the lower limit thereof is more preferably 10% by weight.

In the present invention, it is particularly preferred to use the condensation-reactive group-containing polysilsesquioxane or to use the D·T-unit condensation-reactive group-containing polysiloxane and the condensation-reactive group-containing polysilsesquioxane in combination as the condensation-reactive silicone resin, in terms of flexibility, strength, flame resistance, and the like. In this case, the upper limit of the ratio of the D·T-unit condensation-reactive group-containing polysiloxane to the condensation-reactive group-containing polysilsesquioxane [the former/the latter (weight ratio)] is, for example, 4.9, preferably 3, further preferably 2, and the lower limit thereof is, for example, 0, preferably 0.02; but the upper limit is 100 for further imparting flexibility.

In the present invention, the inorganic oxide particle-containing condensation-reactive silicone resin (A) comprises a crosslinking structure in which inorganic oxide particles dispersed in a polysiloxane resin having a condensation-reactive group are crosslinked with the polysiloxane resin by chemical bonds. The inorganic oxide particle-containing condensation-reactive silicone resin (A) has high heat resistance and strength because the condensation-reactive silicone resin is crosslinked with the inorganic oxide particles by chemical bonds.

A polysiloxane resin having a condensation-reactive group such as described above can be used. Among others, a condensation-reactive group-containing polysilsesquioxane or a combination of a D·T-unit condensation-reactive group-containing polysiloxane and the condensation-reactive group-containing polysilsesquioxane is preferred.

The inorganic oxide particles may be inorganic oxide particles having a reactive functional group on the surface of the particles, and examples thereof include silica ($SiO_2$ or $SiO$), alumina ($Al_2O_3$), glass frit, and antimony-doped tin oxide (ATO). The inorganic oxide particles may be composite inorganic oxide particles comprising two or more inorganic oxides. Among these, silica is particularly preferred. The inorganic oxide particles may be used alone or in combination of two or more thereof.

Examples of the reactive functional group include a hydroxyl group, an isocyanate group, a carboxyl group, an epoxy group, an amino group, a mercapto group, a vinyl-type unsaturated group, a halogen atom, and an isocyanurate group. Among these, a hydroxyl group is preferred. The hydroxyl group on the surface of silica particles is present as a silanol group.

The upper limit of the average particle size (primary particle size) of the inorganic oxide particles is for example 500 μm, preferably 100 μm, further preferably 10 μm, particularly preferably 1 μm, and the lower limit thereof is, for example, 1 nm. Note that the average particle size can be measured by dynamic light scattering or the like.

The inorganic oxide particles desirably have a narrower particle size distribution and are desirably dispersed in a monodisperse state while keeping a primary particle size. Further, the surface potential of inorganic oxide particles is preferably in an acidic region (for example, a pH of 2 to 5, preferably a pH of 2 to 4). The inorganic oxide particles may have such surface potential during the reaction with a polysiloxane resin.

It is preferred to use colloidal inorganic oxide particles as the inorganic oxide particles. Examples of the colloidal inorganic oxide particles include colloidal silica (colloidal silica), colloidal alumina (alumina sol), and colloidal tin oxide (tin oxide aqueous dispersion).

Examples of the colloidal silica include a colloid of fine particles (having an average particle size of, for example, 5 to 1000 nm, preferably 10 to 100 nm) of silicon dioxide (silicic anhydride), as described in Japanese Patent Laid-Open No. 53-112732, Japanese Patent Publication No. 57-9051, Japanese Patent Publication No. 57-51653, and the like.

The colloidal silica can optionally contain, for example, alumina and sodium aluminate, and can optionally also contain a stabilizer such as an inorganic base (for example, sodium hydroxide, potassium hydroxide, lithium hydroxide, and ammonia) and an organic base (for example, tetramethylammonium).

Such colloidal silica can be produced by, but not particularly limited to, a known sol-gel method or the like, specifically, a sol-gel method as described, for example, in Werner Stober et al; J. Colloid and Interface Sci., 26, 62-69 (1968), Rickey D. Badley et al; Langmuir 6, 792-801 (1990), Journal of the Japan Society of Colour Material, 61 [9] 488-493 (1988), and the like.

The colloidal silica is preferably in a bare state where surface treatment is not applied thereto. A silanol group is present in the colloidal silica as a surface functional group.

Commercially available products can be used as such colloidal silica, and specific examples thereof include: trade names "SNOWTEX-XL", "SNOWTEX-YL", "SNOWTEX-ZL", "PST-2", "SNOWTEX-20", "SNOWTEX-30", "SNOWTEX-C", "SNOWTEX-O", "SNOWTEX-OS", "SNOWTEX-OL", and "SNOWTEX-50" (these are manufactured by Nissan Chemical Industries, Ltd.), and trade names "ADELITE AT-30", "ADELITE AT-40", and "ADELITE AT-50" (these are manufactured by Nippon Aerosil Co., Ltd.). Among these, trade names "SNOWTEX-O", "SNOWTEX-OS", "SNOWTEX-OL" and the like are particularly preferred.

Further, commercially available products can be used also as the colloidal inorganic particles other than the colloidal silica as described above, and specific examples thereof include: alumina sol (hydrosol) such as trade name "TTO-W-5" (manufactured by Ishihara Sangyo Kaisha, Ltd.) and trade name "TS-020" (manufactured by TAYCA CORP.), and a tin oxide aqueous dispersion such as trade names "SN-100D" and "SN-100S" (these are manufactured by Ishihara Sangyo Kaisha, Ltd.).

In the present invention, the inorganic oxide particles are preferably colloidal silica having a primary particle size in the range of 1 nm to 500 μm and a surface potential in the range of a pH of 2 to 5, wherein the silanol group on the surface of the colloidal silica is chemically bonded with the polysiloxane resin to thereby crosslink the polysiloxane resin.

The content of the inorganic oxide particles in the inorganic oxide particle-containing condensation-reactive silicone resin can be suitably selected, but the upper limit thereof is, for example, 30% by weight, preferably 20% by weight, further preferably 15% by weight, and the lower limit thereof is, for example, 1% by weight, preferably 2% by weight, further preferably 3% by weight. If the content of the inorganic oxide particles is too low, the mechanical strength of a coating film will tend to be reduced, and if the content of the inorganic oxide particles is too high, a coating film will tend to be brittle.

Next, a method for producing the inorganic oxide particle-containing condensation-reactive silicone resin will be described.

The inorganic oxide particle-containing condensation-reactive silicone resin can be produced, for example, by allowing the inorganic oxide particles to react with a polysiloxane resin having a condensation-reactive group (preferably, a condensation-reactive group-containing polysilsesquioxane or a D·T-unit condensation-reactive group-containing polysiloxane and a condensation-reactive group-containing polysilsesquioxane, or a polysiloxane resin having a silanol group in addition thereto) in a solvent, preferably in the presence of an acid. Note that the polysiloxane resin has a functional group which can react with a reactive functional group on the particle surface of the inorganic oxide particles. When the reactive functional group on the particle surface of the inorganic oxide particles is a silanol group, the condensation-reactive group will react with the silanol group to form a crosslinking structure.

Examples of the solvent include water; an alcohol such as methanol, ethanol, 2-propanol, and 2-methoxyethanol; and a mixed solution thereof. Among these, a mixed solvent of water and an alcohol is preferred, more preferably a mixed solvent of water and 2-propanol, and a mixed solvent of water, 2-propanol, and 2-methoxyethanol.

Examples of the acid include inorganic acid such as hydrochloric acid, nitric acid, sulfuric acid, and phosphoric acid; and organic acid such as acetic acid and p-toluenesulfonic acid. Among these, inorganic acid is preferred, and nitric acid is particularly preferred. These acids can be used as an aqueous solution. The amount of the acid used may be an amount that can adjust the pH of a reaction system to about 2 to 5 (preferably, 2 to 4).

The reaction method is not particularly limited, and examples thereof may include any of the following methods: (i) a method of adding a mixed solution of a polysiloxane resin and a solvent to a mixed solution of inorganic oxide particles and a solvent; (ii) a method of adding a mixed solution of inorganic oxide particles and a solvent to a mixed solution of a polysiloxane resin and a solvent; and (iii) a method of adding both a mixed solution of inorganic oxide particles and a solvent and a mixed solution of a polysiloxane resin and a solvent to a solvent.

Note that when a D·T-unit condensation-reactive group-containing polysiloxane and a condensation-reactive group-containing polysilsesquioxane are used in combination as a polysiloxane resin, the inorganic oxide particles are allowed to react with the D·T-unit condensation-reactive group-containing polysiloxane and the condensation-reactive group-containing polysilsesquioxane; or the inorganic oxide particles are allowed to react first with the D·T-unit condensation-reactive group-containing containing polysiloxane and then with the condensation-reactive group-containing polysilsesquioxane; or the inorganic oxide particles are further allowed to react first with the condensation-reactive group-containing polysilsesquioxane and then with the D·T-unit condensation-reactive group-containing polysiloxane. In the present invention, when employing a method in which the inorganic oxide particles are allowed to react first with the condensation-reactive group silyl group-containing polysilsesquioxane and then with the D·T-unit condensation-reactive group-containing polysiloxane and/or the polysiloxane resin having a silanol group, the flexibility of the resin sheet or the resin layer will be significantly improved in the case of producing a flame-retardant silicone resin sheet or in the case of providing a flame-retardant silicone resin layer by coating at least one surface of a substrate.

The upper limit of the reaction temperature is, for example, 150° C., preferably 130° C., and the lower limit thereof is, for example, 40° C., preferably 50° C. Further, the upper limit of the reaction time is, for example, 24 hours, preferably 12 hours, and the lower limit thereof is, for example, 0.2 hour, preferably 0.5 hour.

After completion of the reaction, a silicone resin composition containing an inorganic oxide particle-containing condensation-reactive silicone resin (A) can be obtained by optionally distilling off the solvent to adjust the concentration and viscosity.

[Inorganic Particles (B)]

Examples of the inorganic particles (B) include, but not particularly limited to, silica particles, alumina particles, aluminum hydroxide particles, magnesium oxide particles, magnesium hydroxide particles, tin oxide particles, particles of clay minerals (such as talc and zeolite), and glass frit. These may be used alone or in combination of two or more thereof. The inorganic particles (B) are not chemically bonded with the polysiloxane resin having a condensation-reactive group.

Among the above, silica particles, alumina particles, aluminum hydroxide particles, magnesium hydroxide particles, and glass frit are preferred in that high flame-retardant effect can be obtained with a small amount thereof. Further, silica particles and glass frit are more preferred in that transparency can be obtained, and glass frit is particularly preferred in that heat build-up suppression effect can be obtained in the cone calorimeter test.

Examples of the silica particles include dry process silica particles such as fumed silica particles and fused silica particles; wet process silica particles; silica gel particles; and colloidal silica particles. Among these silica particles, fumed silica particles such as Aerosil are preferred, and hydrophobic fumed silica particles are particularly preferred.

The yield point of glass frit is preferably 300 to 700° C., more preferably 300 to 650° C., further preferably 300 to 600° C. In the case where a flame-retardant silicone resin sheet is produced, the effect of suppressing the calorific value of this sheet can sufficiently be developed also in the cone calorimeter test by bringing the yield point of glass frit into the above range.

Any suitable glass frit can be employed as the glass frit. Such glass frit is preferably inorganic particles (glass frit) having sinterability, and more preferably inorganic particles (glass frit) formed from at least one component selected from silicic acid (or silicon oxide), boric acid (or boron oxide), borosilicic acid, aluminum oxide, calcium oxide, sodium oxide, lithium oxide, and phosphorus oxide. Examples of representative glass frit include phosphate glass frit, borosilicate glass frit, non-alkali glass frit, and enamel frit. Particularly preferred glass frit is the glass frit formed from a component which contains at least phosphorus oxide. In the glass frit formed from a component which contains at least phosphorus oxide, the content of phosphorus oxide is, for example, 5 to 70% by weight; the lower limit thereof is preferably 10% by weight, further preferably 20% by weight; and the upper limit thereof is preferably 60% by weight, further preferably 50% by weight. In the case where a flame-retardant silicone resin sheet is produced, the effect of suppressing the calorific value of this sheet can sufficiently be developed also in the cone calorimeter test by employing the glass frit as described above.

The average particle size of glass frit is preferably 0.1 μm to 1000 μm. The lower limit of the average particle size of glass frit is more preferably 0.5 μm, further preferably 1 μm, particularly preferably 2 μm. Further, the upper limit of the average particle size of glass frit is more preferably 500 μm, further preferably 300 μm, particularly preferably 150 μm. In the case where a flame-retardant silicone resin sheet is produced, the effect of suppressing the calorific value of this sheet can sufficiently be developed also in the cone calorimeter test by bringing the average particle size of glass frit into the above range.

Inorganic particles having a hollow structure may be used as the inorganic particles (B). Examples of such inorganic particles include silica having a hollow structure and a glass frit having a hollow structure (such as phosphate glass frit) (including a hollow glass bead).

The upper limit of the average particle size (primary particle size) of the inorganic particles (B) is, for example, 500 μm, preferably 300 μm, further preferably 200 μm, particularly preferably 100 μm, and the lower limit thereof is, for example, 1 nm. Note that the average particle size can be measured by dynamic light scattering or the like.

In the flame-retardant silicone resin composition of the present invention, the content of the inorganic particles (B) is, for example, 0.1 to 500 parts by weight relative to 100 parts by weight of the inorganic oxide particle-containing condensation-reactive silicone resin (A); the upper limit of the content is preferably 400 parts by weight, particularly preferably 300 parts by weight; and the lower limit of the content is preferably 0.5 part by weight, more preferably 1 part by weight, particularly preferably 2 parts by weight.

An additive such as a curing catalyst may be optionally added to the flame-retardant silicone resin composition of the present invention.

The flame-retardant silicone resin composition of the present invention can be produced, for example, by adding the inorganic particles (B) to the silicone resin composition containing the inorganic oxide particle-containing condensation-reactive silicone resin (A) obtained by the above method.

The upper limit of the solid concentration of the flame-retardant silicone resin composition of the present invention is, for example, 95% by weight, preferably 90% by weight, and the lower limit thereof is, for example, 20% by weight, preferably 30% by weight, in terms of handleability, coatability, impregnating ability, and the like.

[Flame-retardant Silicone Resin Sheet]

The flame-retardant silicone resin sheet of the present invention is formed from the flame-retardant silicone resin composition of the present invention. FIG. 1 is a schematic sectional view showing the flame-retardant silicone resin sheet of the present invention. Reference numeral 1 denotes a flame-retardant silicone resin sheet.

The flame-retardant silicone resin sheet of the present invention can be produced, for example, by coating a substrate, the surface of which is subjected to release treatment, with the flame-retardant silicone resin composition of the present invention, followed by drying.

The coating method of the flame-retardant silicone resin composition is not particularly limited; for example, the flame-retardant silicone resin sheet can be obtained by directly coating the substrate, the surface of which is subjected to release treatment, with the composition by a known coating method such as kiss coating, gravure coating, bar coating, spray coating, knife coating, wire coating, dip coating, die coating, curtain coating, dispenser coating, screen printing, and metal mask printing to form a coating film and optionally drying the film, for example, at a temperature of about 80 to 200° C.

For the storage stability of the flame-retardant silicone resin composition, and in order to reduce the air bubble defects and appearance unevenness during the film formation, it is preferred to add a water soluble organic solvent excluding aliphatic monohydric alcohols to the flame-retardant silicone resin composition before performing the coating. The amount of the water soluble organic solvent used excluding aliphatic monohydric alcohols is not particularly limited, but it is, for example, 0.01 to 200 parts by weight, preferably 0.1 to 150 parts by weight relative to 100 parts by weight of the flame-retardant silicone resin composition (solids).

Specific examples of the water soluble organic solvent excluding aliphatic monohydric alcohols include glycol ether solvents such as methyl cellosolve (2-methoxyethanol), ethyl cellosolve (2-ethoxyethanol), ethylene glycol isopropyl ether, butyl cellosolve, carbitol, butyl carbitol, diethylene glycol acetate, ethylene glycol monophenyl ether, ethylene glycol monobenzyl ether, methoxy methoxy ethanol, propylene glycol monomethyl ether, propylene glycol monoethyl ether, and ethylene glycol monoacetate; glycol solvents such as ethylene glycol, tetraethylene glycol, propylene glycol, and dipropylene glycol; nitrogen-containing solvents such as N-methylpyrrolidone, dimethylformamide, and dimethylacetamide; and dimethylsulfoxide. These may be used alone or in combination of two or more thereof. Among them, glycol ether solvents are preferred in that they have good solubility in a hydrolyzed alkoxysilane and a condensation product thereof.

In the flame-retardant silicone resin sheet of the present invention, the total content of the inorganic oxide particles in the inorganic oxide particle-containing condensation-reactive silicone resin (A) and the inorganic particles (B) can be suitably selected, but the upper limit of the total content is, for example, 90% by weight, preferably 85% by weight, further preferably 80% by weight, and the lower limit of the total content is, for example, 2% by weight, preferably 3% by weight, further preferably 4% by weight. If the content is too low, the mechanical strength and flame retardancy of the sheet will tend to be reduced, and conversely if the content is too high, the sheet will tend to be brittle.

The upper limit of the thickness of the flame-retardant silicone resin sheet is, for example, 5000 μm, preferably 4000 μm, more preferably 3000 μm, further preferably 2000 μm, and the lower limit of the thickness is, for example, 5 μm, preferably 10 μm, further preferably 20 μm.

The flame-retardant silicone resin sheet of the present invention has excellent flame retardancy, and preferably has flame resistance. For example, it hardly results in spread of fire or does not result in spread of fire in the test according to the combustion test of the Japan Railway Rolling Stock & Machinery Association (general materials; 45° ethyl alcohol test of nonmetallic materials for railway rolling stock use). Further, carbonization is preferably not observed on the surface of the sheet, and more preferably, the sheet does not undergo penetration nor melt dropping.

Further, the flame-retardant silicone resin sheet of the present invention has excellent flame retardancy. For example, in the test according to the cone calorimeter test of the Japan Railway Rolling Stock & Machinery Association (ceiling material; ISO 5660-1), the sheet does not undergo penetration. Preferably, the gross calorific value per 10 minutes is not more than 30 MJ/m$^2$; the maximum heat release rate is not more than 300 kW/m$^2$; and ignition time is not less than 60 seconds.

Since the flame-retardant silicone resin sheet of the present invention is excellent in high heat resistance, flame retardancy, and strength, it can be used as an interior member (interior member for transportation equipment) of transportation equipment, such as railway rolling stock, an airplane, a motor vehicle, a ship, an elevator, and an escalator, a building material member, a display member, a household appliance member, an electronic circuit member, a surface protection material, a surface coating material, and the like. Especially, it can be suitably used as an illumination cover as the interior member for transportation equipment.

When the flame-retardant silicone resin sheet of the present invention is used as a surface protection material, a surface coating material, and the like of a molded article, for example, in-mold molding, an overlay method, and the like can be used. In the in-mold molding, the flame-retardant silicone resin sheet of the present invention is inserted into a mold; a thermoplastic resin which is a raw material of the molded article is injection molded; and at the same time as the injection molding, the flame-retardant silicone resin sheet is bonded to the surface of a plastic molded article in the mold. Further, in the overlay method, the flame-retardant silicone resin sheet of the present invention is bonded to the surface of a molded article by vacuum compression bonding. By these methods, it is possible to obtain a molded article, the surface of which is coated with the flame-retardant silicone resin sheet, and to which high heat resistance, flame retardancy, and strength are imparted. In the overlay method, the material of the molded article is not particularly limited, and it may be any of, for example, a plastic, a thermosetting resin cured product, wood, and the like. The molded article obtained in this way, the surface of which is coated with the flame-retardant silicone resin sheet, can be used as an interior member (interior member for transportation equipment) of transportation equipment, such as railway rolling stock, an airplane, a motor vehicle, a ship, an elevator, and an escalator, a building material member, a display member, a household appliance member, an electronic circuit member, and the like.

The flame-retardant silicone resin sheet of the present invention can be imparted with functional layers, such as a hard-coat layer, a stain-resistant layer, an antistatic layer, a light diffusion layer, an antireflection layer, an ultraviolet absorption layer, a heat shield layer, a heat insulating layer, a thermal conduction layer, and a solvent resistant layer, within a range that does not impair flame retardancy.

The flame-retardant silicone resin sheet of the present invention may contain any suitable other components within a range that does not impair flame retardancy. Such other components may be contained alone or in combination of two or more thereof.

Examples of other components include other polymer components, a softener, an antioxidant, an antiaging agent, a curing agent, a plasticizer, a filler, a thermal polymerization initiator, a photopolymerization initiator, an ultraviolet absorber, a light stabilizer, a coloring agent (such as pigment and dye), a solvent (organic solvent), and a surfactant (for example, an ionic surfactant, a silicone surfactant, a fluorochemical surfactant), and the like.

The luminaire of the present invention is a luminaire using the above flame-retardant silicone resin sheet, the luminaire comprising: at least a light source for generating light used for illumination; and an illumination cover comprising the flame-retardant silicone resin sheet, being installed so as to cover the light source, wherein the light from the light source is emitted after passing through the flame-retardant silicone resin sheet.

In the luminaire, a method of attaching the illumination cover, the arrangement of the illumination cover, and the like are not particularly limited, and a known method and arrangement can be employed.

EXAMPLES

Hereinafter, the present invention will be more specifically described with reference to Examples and Comparative Example. However, the present invention is not limited to them at all. Note that in the following description, "part" and "%" are on a weight basis unless otherwise indicated.

Synthesis Example 1

To a vessel provided with a stirrer, a reflux condenser, and a nitrogen introducing pipe, were added 50 g of a colloidal silica solution having an average particle size of 8 to 11 nm (trade name: SNOWTEX-OS, manufactured by Nissan Chemical Industries, Ltd., a solid concentration of 20%), and 84 g of 2-propanol, and thereto was added concentrated nitric acid to adjust the acidity (pH) of the solution to within the range of 2 to 4. Next, the resulting solution was heated to a temperature of 65° C., and then thereto was dropwise added a solution of 58 g of a silsesquioxane compound having a reactive methoxysilyl group at a molecular terminal (trade name: X-40-9225, manufactured by Shin-Etsu Chemical Co., Ltd., a methoxy content of 24%) dissolved in 58 g of 2-propanol, using a dropping funnel over 2 hours to allow the silsesquioxane compound to react with the surface of the colloidal silica particles.

Next, thereto was dropwise added a solution of 42 g of a polysiloxane compound derived from a trifunctional alkoxysilane and a bifunctional alkoxysilane each having a reactive methoxysilyl group at a molecular terminal (trade name: X-40-9246, manufactured by Shin-Etsu Chemical Co., Ltd., a methoxy content of 12%) dissolved in 42 g of 2-propanol over 1 hour to allow the polysiloxane compound to react with the silsesquioxane compound on the colloidal silica. The reaction mixture was heated and stirred at 65° C. for 1 hour, then cooled to room temperature (25° C.) to obtain a liquid transparent resin composition A.

Synthesis Example 2

To a vessel provided with a stirrer, a reflux condenser, and a nitrogen introducing pipe, were added 50 g of a colloidal silica solution having an average particle size of 8 to 11 nm (trade name: SNOWTEX-OS, manufactured by Nissan Chemical Industries, Ltd., a solid concentration of 20%) and 84 g of 2-propanol. Thereto was added concentrated nitric acid to adjust the acidity (pH) of the solution to within the range of 2 to 4. Next, the resulting solution was heated to a temperature of 65° C., and then thereto was dropwise added a solution of 25 g of a silsesquioxane compound having a reactive methoxysilyl group at a molecular terminal (trade name: X-40-9225, manufactured by Shin-Etsu Chemical Co., Ltd., a methoxy content of 24%) dissolved in 25 g of 2-propanol, using a dropping funnel over 2 hours to allow the silsesquioxane compound to react with the surface of the colloidal silica particles.

Next, thereto was dropwise added a solution of 75 g of a polysiloxane compound derived from a trifunctional alkoxysilane and a bifunctional alkoxysilane each having a reactive methoxysilyl group at a molecular terminal (trade name: X-40-9246, manufactured by Shin-Etsu Chemical Co., Ltd., a methoxy content of 12%) dissolved in 75 g of 2-propanol over 1 hour to allow the polysiloxane compound to react with the silsesquioxane compound on the colloidal silica. The reaction mixture was heated and stirred at 65° C. for 1 hour and then cooled to room temperature (25° C.) to obtain a liquid transparent resin composition solution B.

Example 1

To the transparent resin composition solution A obtained in Synthesis Example 1, was added 200 parts by weight of glass frit (trade name "VY0053L" manufactured by Nippon Frit Co., Ltd.) relative to 100 parts by weight of the solids in the transparent resin composition solution A, followed by stirring and mixing to obtain a silicone resin composition A.

Example 2

The silicone resin composition A obtained in Example 1 was concentrated to a solid concentration of 76% by weight. Then, the concentrated composition was applied to a polyethylene terephthalate (PET) film subjected to release treatment (thickness: 38 µm, trade name "MRF#38" manufactured by Mitsubishi Plastics Inc.) using an applicator manufactured by TESTER SANGYO CO., LTD. so that the thickness of the coating film after drying might be 380 µm. Then, the resulting coating film was heated and dried at 90° C. for 30 minutes and then at 120° C. for 10 minutes in an oven with internal air circulation and the polyethylene terephthalate film was removed to obtain a flame-retardant silicone resin sheet.

Example 3

To the transparent resin composition solution B obtained in Synthesis Example 2, was added 200 parts by weight of glass frit (trade name "VY0053M" manufactured by Nippon Frit Co., Ltd.) relative to 100 parts by weight of the solids in the transparent resin composition solution A, followed by stirring and mixing to obtain a silicone resin composition B.

Example 4

The silicone resin composition B obtained in Example 3 was concentrated to a solid concentration of 76% by weight. Then, the concentrated composition was applied to a polyethylene terephthalate (PET) film subjected to release treatment (thickness: 38 µm, trade name "MRF#38" manufactured by Mitsubishi Plastics Inc.) using an applicator manufactured by TESTER SANGYO CO., LTD. so that the thickness of the coating film after drying might be 380 µm. Then, the resulting coating film was heated and dried at 90° C. for 30 minutes and then at 120° C. for 10 minutes in an oven with internal air circulation and the polyethylene terephthalate film was removed to obtain a flame-retardant silicone resin sheet.

Comparative Example 1

The transparent resin composition solution A obtained in Synthesis Example 1 was concentrated to a solid concentration of 76% by weight. Then, the concentrated solution was applied to a polyethylene terephthalate (PET) film subjected to release treatment (thickness: 38 µm, trade name "MRF#38" manufactured by Mitsubishi Plastics Inc.) using an applicator manufactured by TESTER SANGYO CO., LTD. so that the thickness of the coating film after drying might be 380 µm. Then, the resulting coating film was heated and dried at 90° C. for 30 minutes and then at 120° C. for 10 minutes in an oven with internal air circulation and the polyethylene terephthalate film was removed to obtain a silicone resin sheet.

<Evaluations>

The following evaluations were performed for the flame-retardant silicone resin sheet and the like obtained in Examples and Comparative Example. The results are shown in Table 1.

(Combustion Test)

Figure 2:
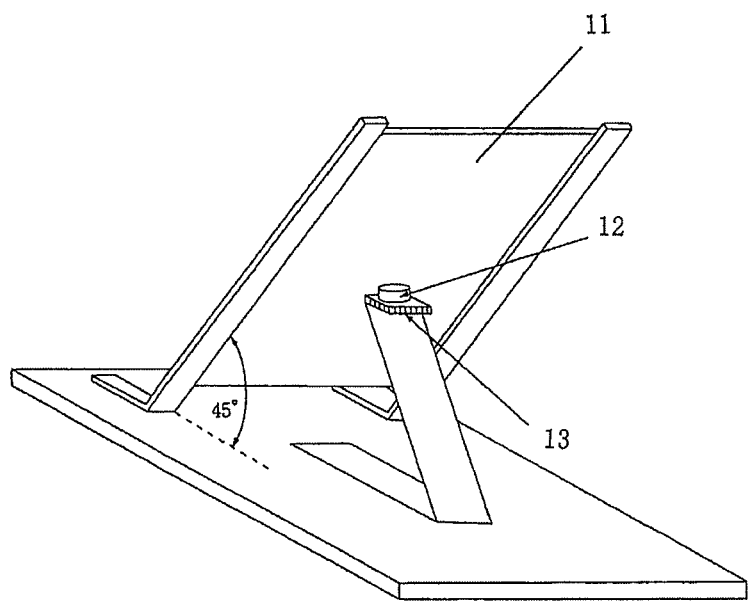
FIG. 2 is a perspective view of a combustion test apparatus used in the combustion test in Examples.

Combustion test was performed using the combustion test apparatus shown in FIG. 2 and according to the combustion test of the Japan Railway Rollingstock & Machinery Association (general materials; 45° ethyl alcohol test of nonmetallic materials for rolling stock use). In FIG. 2, reference numeral 11 denotes a test specimen (182 mm×257 mm); reference numeral 12 denotes an alcohol container (17.5 mm in diameter×7.1 mm in height and 0.8 mm in thickness); and reference numeral 13 denotes a container pedestal (having a low thermal conductivity, such as cork). The distance from the center of the lower surface of the test specimen to the bottom surface of the container is 25.4 mm (1 inch).

A flame-retardant silicone resin sheet produced as described above (a silicone resin sheet in the case of Comparative Example) was held at an inclination of 45° as shown in FIG. 2; the fuel container 12 was put on the cork stand (container pedestal) 13 so that the center of the bottom of the fuel container (alcohol container) 12 might be located 25.4 mm vertically below the center of the lower surface of the test specimen; and 0.5 cc of ethyl alcohol was put into the fuel container 12, ignited, and allowed to stand for about 2 minutes until the fuel burned out. A flame-retardant silicone resin sheet (a silicone resin sheet in the case of Comparative Example) was visually observed for the presence or absence of ignition, carbonization, lingering flame, penetration, and melt dropping, and was evaluated according to the following criteria.

<Ignition, Carbonization, and Lingering Flame>

⊙: No ignition and carbonization during the combustion of ethanol.

○: Ignition and carbonization during the combustion of ethanol, but the fire does not spread but goes out during the combustion of ethanol.

Δ: Ignition after a lapse of 1 minute from the combustion of ethanol, and the fire spreads and does not go out after the combustion of ethanol, or a hole opens in the test specimen.

x: Ignition within 1 minute from the combustion of ethanol, and the fire spreads and does not go out after the combustion of ethanol, or a hole opens in the test specimen.

<Penetration and Melt Dropping>

○: No penetration and melt dropping.

Δ: Penetration or melt dropping after a lapse of 1 minute from the combustion of ethanol.

x: Penetration or melt dropping within 1 minute from the combustion of ethanol.

(Cone calorimeter Test)

Figure 3:
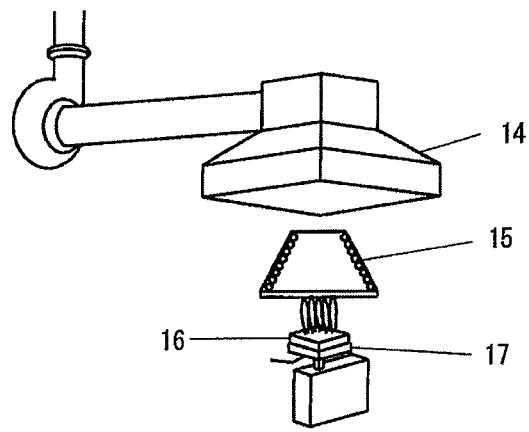
FIG. 3 is a schematic view of a combustion test apparatus used in the cone calorimeter test in Examples.

A test piece in the shape of a flat square with a side length of 100 mm was cut, which was irradiated with heat radiation of 50 kW/m$^2$ for 10 minutes using a cone calorimeter by a method in accordance with ISO 5660-1:2002 as shown in FIG. 3 to burn the test piece. In FIG. 3, reference numeral 14 denotes an exhaust hood; reference numeral 15 denotes a cone type heater; reference numeral 16 denotes a test specimen; and reference numeral 17 denotes a test specimen holder. The combustion is judged by the gross calorific value (MJ/m$^2$), the maximum heat release rate (kW/m$^2$), and ignition time (second) each measured during the test time. The ignition time (second) was defined as the time from the start of the test until the ignition was first recognized, wherein a test piece was regarded as having ignited when flame was present not less than 10 seconds from the time when the flame was recognized on the test piece. Further, the presence or absence of penetration in the test piece was visually observed.

Criteria for Judgment
(1) Gross Calorific Value for 10 Minutes
○: Gross calorific value is not more than 30 MJ/m$^2$.
Δ: Gross calorific value is more than 30 MJ/m$^2$ and less than 45 MJ/m$^2$.
x: Gross calorific value is not less than 45 MJ/m$^2$.
(2) Maximum Heat Release Rate for 10 Minutes
○: Maximum heat release rate is not more than 300 kW/m$^2$.
Δ: Maximum heat release rate is more than 300 kW/m$^2$ and less than 600 kW/m$^2$.
x: Maximum heat release rate is not less than 600 kW/m$^2$.
(3) Ignition Time
○: Ignition time is not less than 60 seconds.
x: Ignition time is less than 60 seconds.
(4) Penetration
○: No penetration.
x: Penetration.

TABLE 1

| | Railway Rolling Stock Material Combustion Test | | | | | | | | |
|---|---|---|---|---|---|---|---|---|---|
| | Combustion test | | | Cone calorimeter test | | | | | |
| | Ignition/ Carbonization/ Lingering flame | Penetration/ Melt dropping | | Gross calorific value (MJ/m$^2$) | | Maximum heat release rate (kW/m$^2$) | | Ignition time (second) | Penetration |
| Example 1 | ⊙ | ○ | ○ | 0.13 | ○ | 2.48 | ○ | >600 | ○ |
| Example 2 | ⊙ | ○ | ○ | 0.18 | ○ | 1.97 | ○ | >600 | ○ |
| Comparative Example 1 | ⊙ | x | ○ | 4.56 | ○ | 33.17 | x | 12 | x |

INDUSTRIAL APPLICABILITY

The resin sheet obtained from the flame-retardant silicone resin composition of the present invention is significantly excellent in flame retardancy, does not result in spread of fire when it is brought into contact with flame, and preferably does not ignite nor carbonize. Therefore, it is particularly useful as an interior member of transportation equipment, such as railway rolling stock, an airplane, a motor vehicle, a ship, an elevator, and an escalator; a building material member, a display member, a household appliance member, and an electronic circuit member. In addition, it can be particularly suitably used as an illumination cover of a luminaire.

REFERENCE SIGNS LIST

1 Flame-Retardant Silicone Resin Sheet
11 Test Specimen
12 Alcohol Container (Fuel Container)
13 Container Pedestal
14 Exhaust Hood
15 Cone Type Heater
16 Test Specimen
17 Test Specimen Holder

The invention claimed is:

1. A flame-retardant silicone resin composition comprising: an inorganic oxide particle-containing condensation-reactive silicone resin (A) comprising a crosslinking structure in which inorganic oxide particles dispersed in a polysiloxane resin having a condensation-reactive group are crosslinked with the polysiloxane resin by chemical bonds; and glass frit (B).

2. The flame-retardant silicone resin composition according to claim 1, wherein the inorganic oxide particles are at least one type of inorganic oxide particles selected from the group consisting of silica, alumina, glass fit, and antimony-doped tin oxide.

3. The flame-retardant silicone resin composition according to claim 1, wherein the yield point of the glass frit (B) is not less than 300° C. and not more than 700° C.

4. The flame-retardant silicone resin composition according to claim 1, wherein the glass frit (B) is a glass frit formed from at least one component selected from silicic acid, boric acid, borosilicic acid, aluminum oxide, calcium oxide, sodium oxide, lithium oxide, and phosphorus oxide.

5. The flame-retardant silicone resin composition according to claim 4, wherein the glass frit (B) is a glass frit formed from a component containing at least phosphorus oxide.

6. The flame-retardant silicone resin composition according to claim 1, wherein the average particle size of the glass frit (B) is 0.1 μm to 1000 μm.

7. The flame-retardant silicone resin composition according to claim 1, wherein the content of the glass frit (B) is 0.1 to 500 parts by weight relative to 100 parts by weight of the inorganic oxide particle-containing condensation-reactive silicone resin (A).

8. The flame-retardant silicone resin composition according to claim 1, wherein (i) a condensation-reactive group-containing polysilsesquioxane having a basic structural unit of a T unit, or (ii) a combination of the condensation-reactive group-containing polysilsesquioxane having a basic structural unit of a T-unit and a condensation-reactive group-containing polysiloxane having a basic structural unit of a D-unit and a T-unit and/or a polysiloxane resin having a silanol group is used as the polysiloxane resin having a condensation-reactive group in the inorganic oxide particle-containing condensation-reactive silicone resin (A).

9. A flame-retardant silicone resin sheet formed from the flame-retardant silicone resin composition according to claim 1.

10. The flame-retardant silicone resin sheet according to claim 9, wherein the sheet has a thickness of 5 to 5000 μm.

11. The flame-retardant silicone resin sheet according to claim 9, wherein the sheet has the property of not igniting or carbonizing in the combustion test of the Railway Rolling Stock Material Combustion Test.

12. The flame-retardant silicone resin sheet according to claim 9, wherein the flame-retardant silicone resin sheet has a gross calorific value per 10 minutes of not more than 30 MJ/m$^2$, a maximum heat release rate of not more than 300 kW/m$^2$, and an ignition time of not less than 60 seconds, as measured by the cone calorimeter test according to ISO 5660-1.

13. An interior member for transportation equipment, a building material member, a display member, a household appliance member, or an electronic circuit member comprising the flame-retardant silicone resin sheet according to claim 9.

14. The interior member for transportation equipment of claim 13 wherein the interior member for transportation equipment is an illumination cover.

15. A luminaire comprising the flame-retardant silicone resin sheet according to claim 9, wherein the luminaire comprises: at least a light source for generating light used for illumination; and an illumination cover comprising the flame-retardant silicone resin sheet, being installed so as to cover the light source, wherein the light from the light source is emitted after passing through the flame-retardant silicone resin sheet.

* * * * *